(12) United States Patent
Kai et al.

(10) Patent No.: US 12,109,614 B2
(45) Date of Patent: Oct. 8, 2024

(54) LAYER FORMING APPARATUS, METHOD OF FORMING POWDER LAYER, AND RECORDING MEDIUM

(71) Applicants: Tomoki Kai, Kanagawa (JP); Yasutomo Aman, Kanagawa (JP); Yasuyuki Yamashita, Kanagawa (JP)

(72) Inventors: Tomoki Kai, Kanagawa (JP); Yasutomo Aman, Kanagawa (JP); Yasuyuki Yamashita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 11 days.

(21) Appl. No.: 17/735,649

(22) Filed: May 3, 2022

(65) Prior Publication Data

US 2022/0388069 A1 Dec. 8, 2022

(30) Foreign Application Priority Data

Jun. 3, 2021 (JP) .................................. 2021-093392

(51) Int. Cl.
*B22F 12/00* (2021.01)
*B22F 10/28* (2021.01)
(Continued)

(52) U.S. Cl.
CPC ............ *B22F 12/226* (2021.01); *B22F 10/28* (2021.01); *B22F 12/50* (2021.01); *B33Y 10/00* (2014.12); *B33Y 30/00* (2014.12)

(58) Field of Classification Search
CPC ........ B22F 12/226; B22F 10/28; B22F 12/50; B22F 12/90; B22F 2999/00; B22F 10/14; B22F 10/73; B22F 12/30; B22F 12/63; B33Y 10/00; B33Y 30/00; B33Y 50/02; Y02P 10/25; B29C 64/357; B29C 64/393; B29C 64/236; B29C 64/35; B29C 64/241; B29C 64/218

See application file for complete search history.

(56) References Cited

U.S. PATENT DOCUMENTS

| | | |
|---|---|---|
| 2004/0154035 A1 | 8/2004 | Aman et al. |
| 2016/0272817 A1 | 9/2016 | Naruse et al. |

(Continued)

FOREIGN PATENT DOCUMENTS

| | | | |
|---|---|---|---|
| EP | 3501692 A1 * | 6/2019 | ............. B22F 10/10 |
| JP | 2018-154047 | 10/2018 | |

(Continued)

OTHER PUBLICATIONS

Extended European Search Report dated Oct. 7, 2022 issued in corresponding European Appln. No. 22171660.8.

*Primary Examiner* — Rebecca Janssen

(74) *Attorney, Agent, or Firm* — Harness, Dickey & Pierce, P.L.C.

(57) ABSTRACT

A layer forming apparatus includes a loading unit including a stage onto which powder is supplied, a rotator that flattens the powder on the stage to form a powder layer, and circuitry. The circuitry causes the rotator to move in a first direction parallel to a surface of the stage and rotate while contacting the powder on the stage to form the powder layer. Further, the circuitry causes the rotator to move in a second direction opposite to the first direction and rotate while contacting surplus powder not on the stage.

9 Claims, 9 Drawing Sheets

(51) Int. Cl.
   *B22F 12/50* (2021.01)
   *B33Y 10/00* (2015.01)
   *B33Y 30/00* (2015.01)

(56) References Cited

U.S. PATENT DOCUMENTS

| | | |
|---|---|---|
| 2018/0264721 A1 | 9/2018 | Iida et al. |
| 2020/0016827 A1 | 1/2020 | Yamashita et al. |
| 2021/0039311 A1 | 2/2021 | Kusahara et al. |
| 2021/0317601 A1 | 10/2021 | Saito et al. |
| 2022/0032379 A1 | 2/2022 | Yamashita et al. |

FOREIGN PATENT DOCUMENTS

| | | |
|---|---|---|
| JP | 2019-023327 | 2/2019 |
| JP | 2020-108975 | 7/2020 |
| JP | 6872170 B2 | 5/2021 |

* cited by examiner

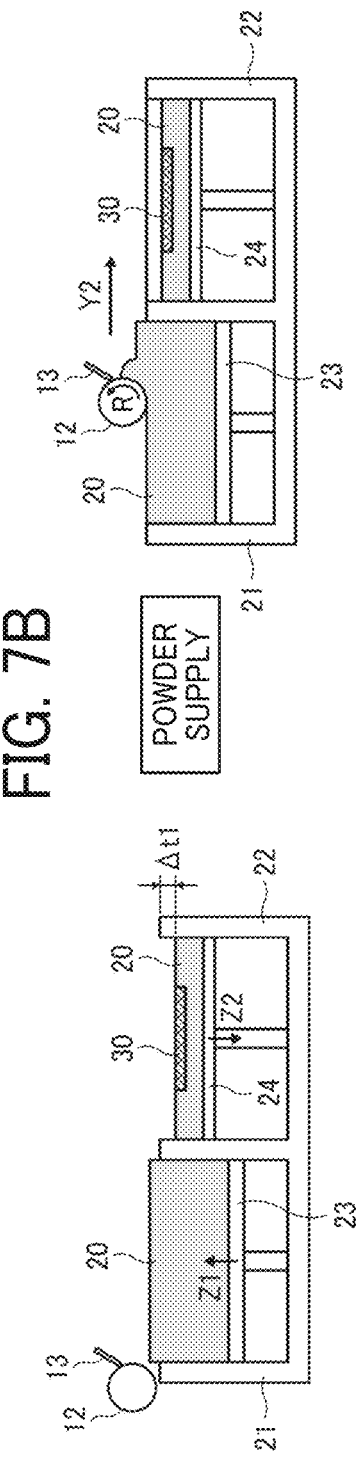
FIG. 7A
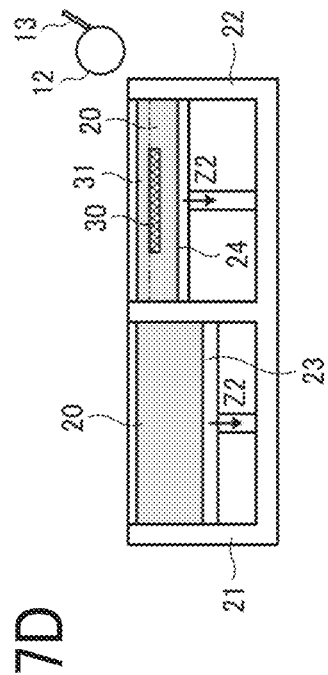
FIG. 7B POWDER SUPPLY
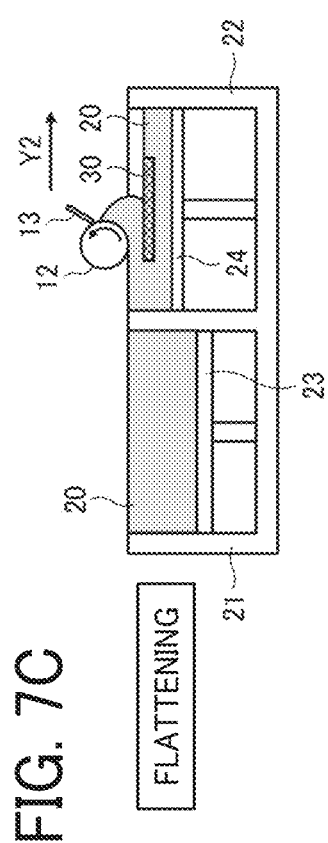
FIG. 7C FLATTENING
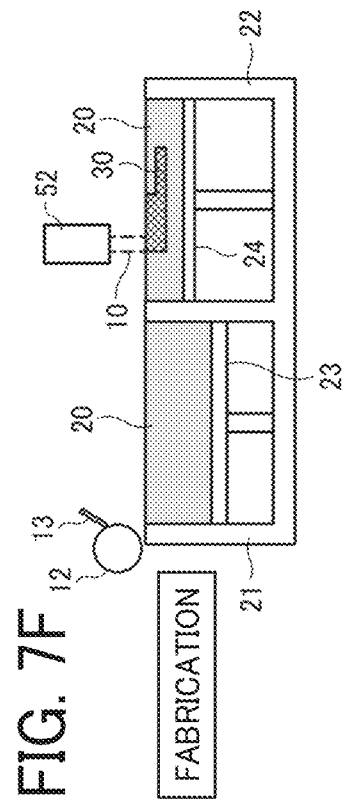
FIG. 7D
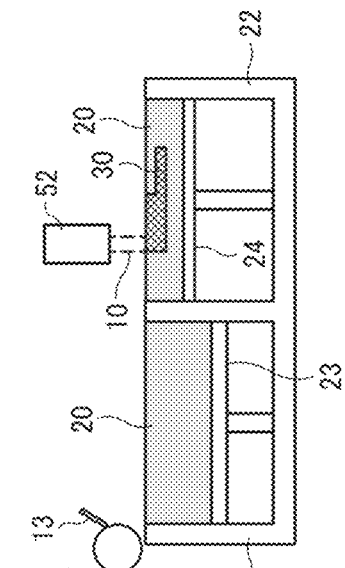
FIG. 7E
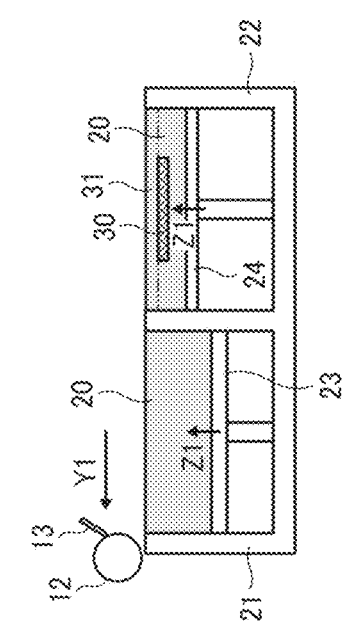
FIG. 7F FABRICATION

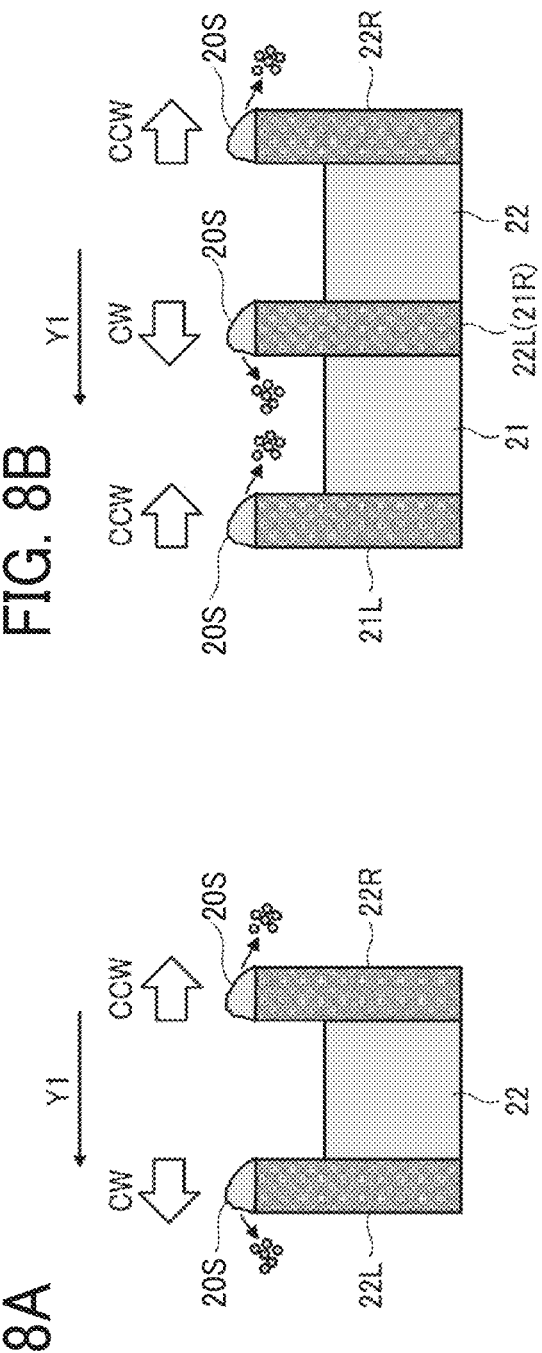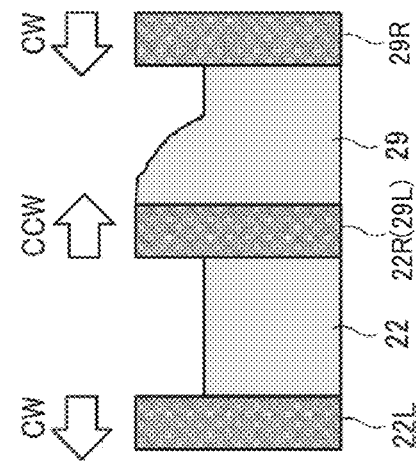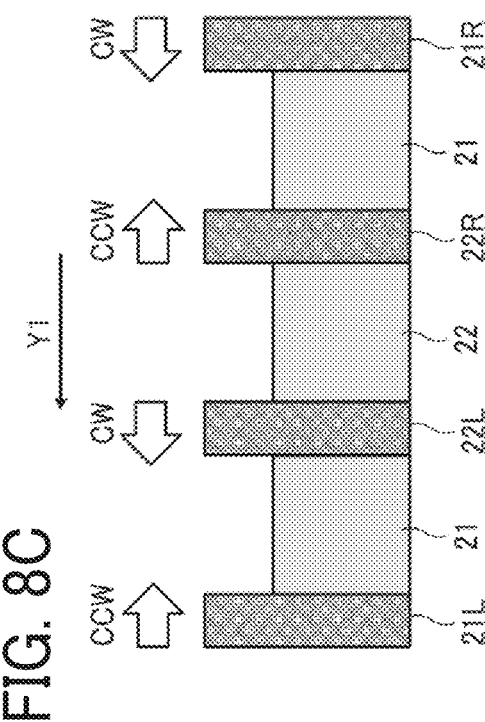

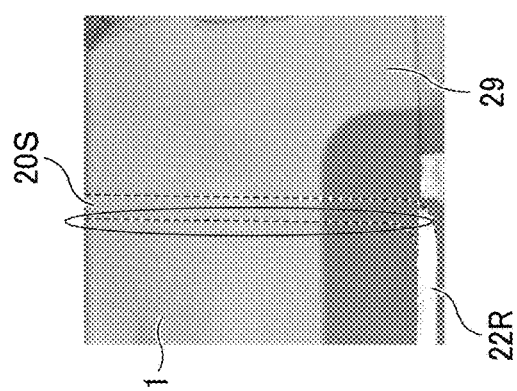
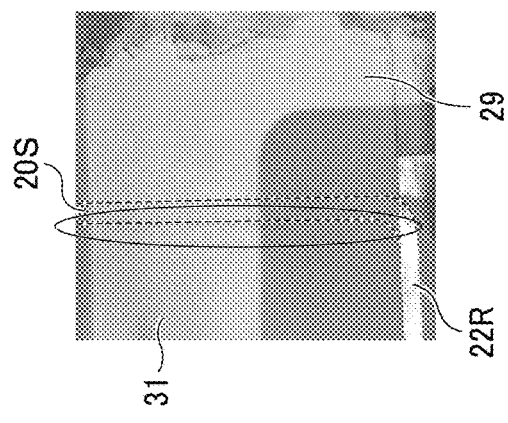
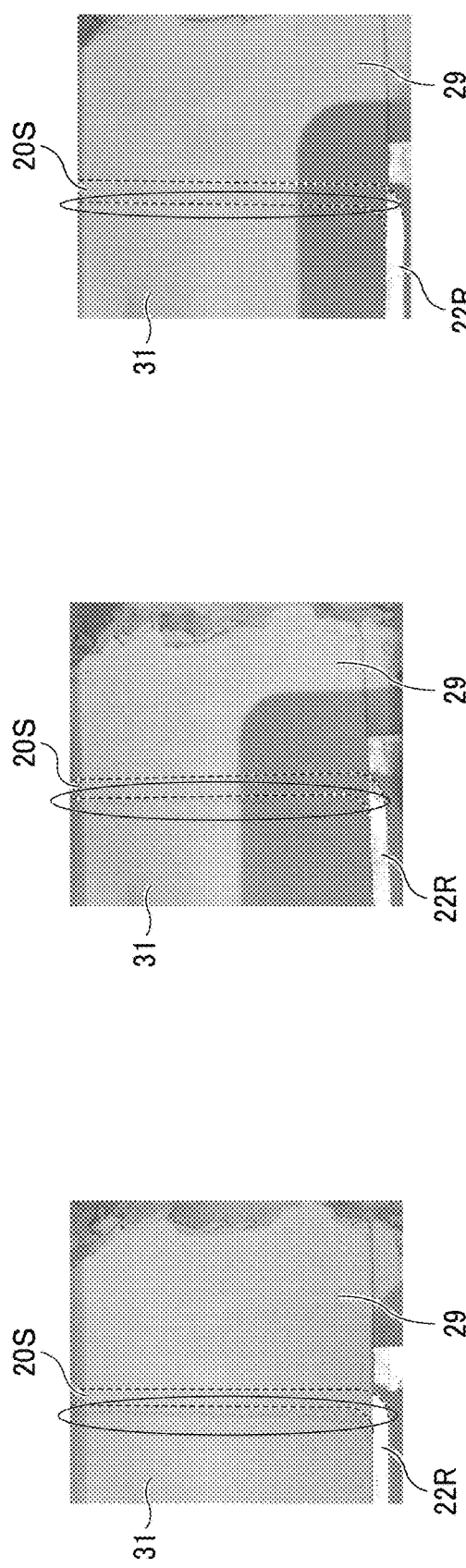
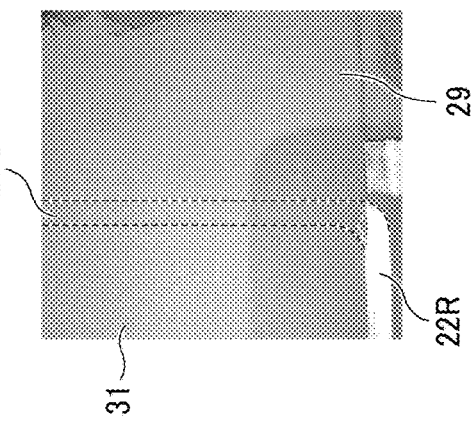
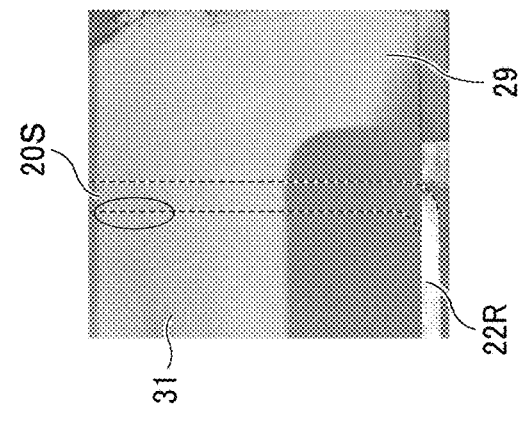

LAYER FORMING APPARATUS, METHOD OF FORMING POWDER LAYER, AND RECORDING MEDIUM

CROSS-REFERENCE TO RELATED APPLICATION

This patent application is based on and claims priority pursuant to 35 U.S.C. § 119(a) to Japanese Patent Application No. 2021-093392, filed on Jun. 3, 2021, in the Japan Patent Office, the entire disclosure of which is hereby incorporated by reference herein.

BACKGROUND

Technical Field

Embodiments of the present disclosure relate to a layer forming apparatus, a method of forming a powder layer, and a recording medium storing program codes for performing the method of forming a powder layer.

Related Art

There is known a three-dimensional fabrication apparatus including a fabrication chamber, a supply chamber, and a flattening member. In the fabrication chamber, powder is spread in a layer to form a powder layer, and the powder in a portion of the powder layer is bonded in a desired shape, thereby forming a layered fabrication object. The supply chamber stores powder to be supplied to the fabrication chamber. The flattening member reciprocally moves on the supply chamber and the fabrication chamber to transfer the powder and flatten the powder supplied in the fabrication chamber.

SUMMARY

Embodiments of the present disclosure describes a layer forming apparatus that includes a loading unit including a stage onto which powder is supplied, a rotator that flattens the powder on the stage to form a powder layer, and circuitry. The circuitry causes the rotator to move in a first direction parallel to a surface of the stage and rotate while contacting the powder on the stage to form the powder layer. Further, the circuitry causes the rotator to move in a second direction opposite to the first direction and rotate while contacting surplus powder not on the stage.

According to other embodiments of the present disclosure, there are provided a method of forming a powder layer and a carrier medium carrying computer readable code for controlling a computer system to carry out the method of forming a powder layer. The method includes supplying powder onto a stage of a loading unit, causing a rotator to move in a first direction parallel to a surface of the stage and rotate while contacting the powder on the stage to flatten the powder to form a powder layer, and causing the rotator to move in a second direction opposite to the first direction and rotate while contacting surplus powder not on the stage.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 7A to 7F are schematic views illustrating operations of fabricating a three-dimensional object in the three-dimensional fabrication apparatus according to the present embodiment;

FIGS. 8A to 8D are schematic views illustrating operations of the three-dimensional fabrication apparatus except when forming a powder layer according to the present embodiment;

FIGS. 9A to 9E are illustrations of surplus powder on the powder layer in the three-dimensional fabrication apparatus according to the present embodiment.

Figure 1:
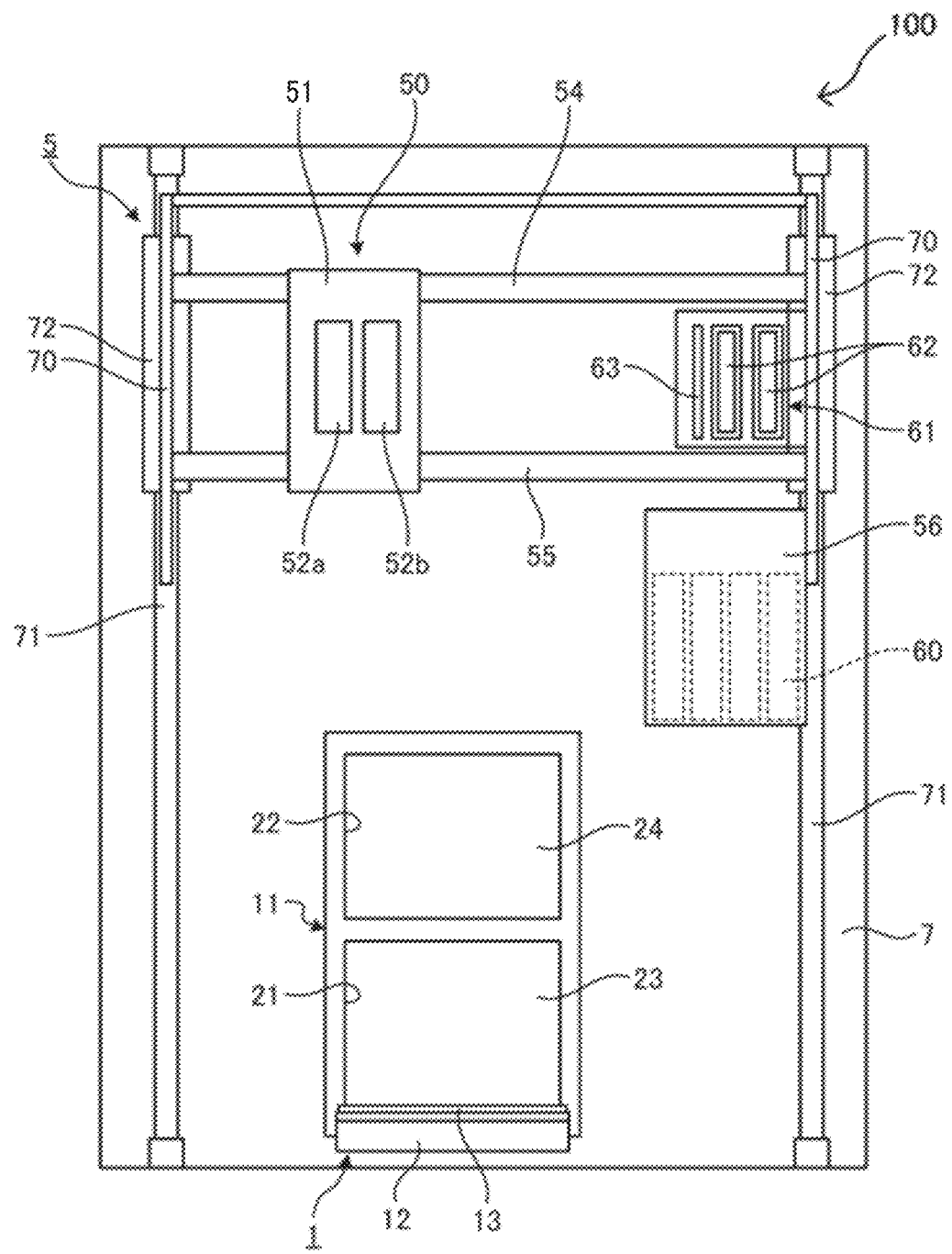
FIG. 1 is a schematic plan view of a three-dimensional fabrication apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected, and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a three-dimensional fabrication apparatus according to embodiments of the present disclosure is described. The three-dimensional fabrication apparatus uses, for example, additive manufacturing to fabricate a three-dimensional object. The three-dimensional object includes a solidified body, a sintered body, a sacrificial molded body, a fabricated body, a green body, and the like described below.

Configuration of Three-Dimensional Fabrication Apparatus

Figure 2:
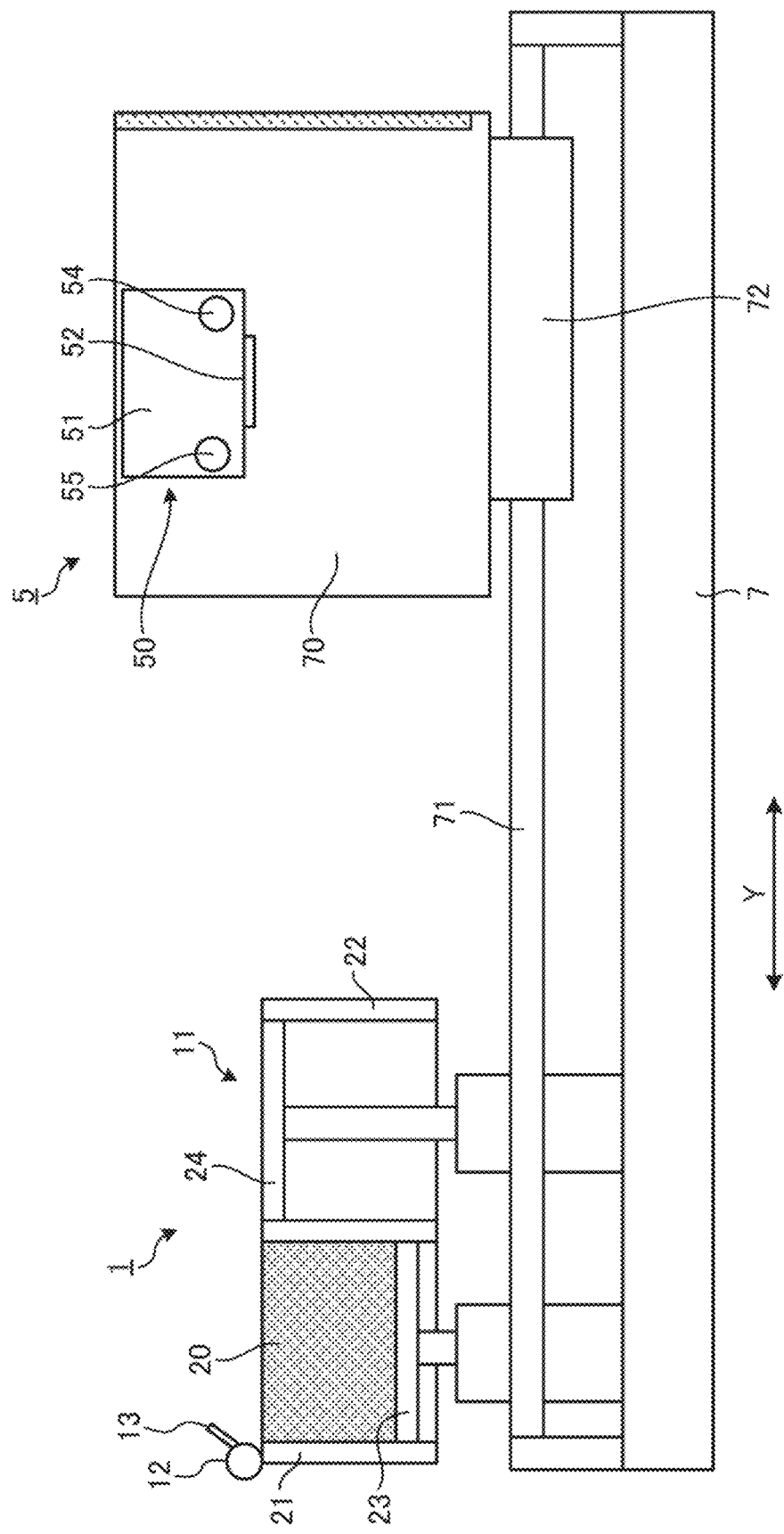
FIG. 2 is a schematic side view of the three-dimensional fabrication apparatus according to the present embodiment.
Figure 3:
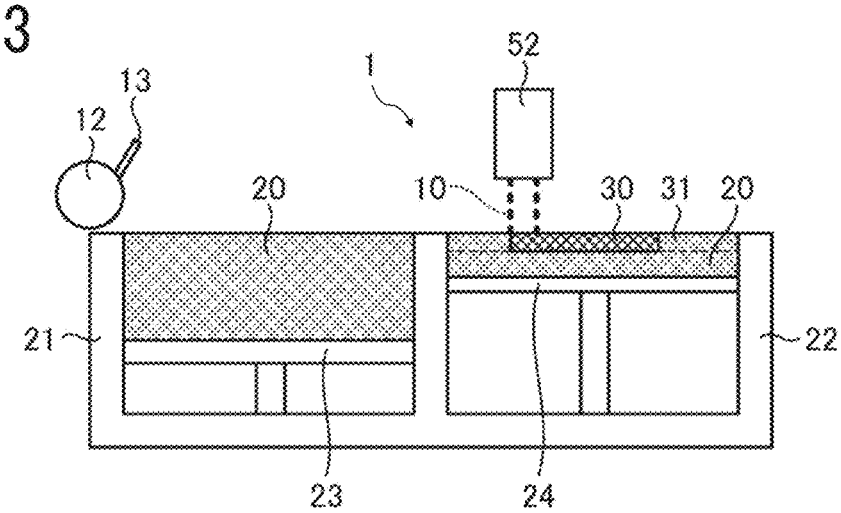
FIG. 3 is a cross-sectional view of a fabrication section included in the three-dimensional fabrication apparatus according to the present embodiment.
Figure 4:
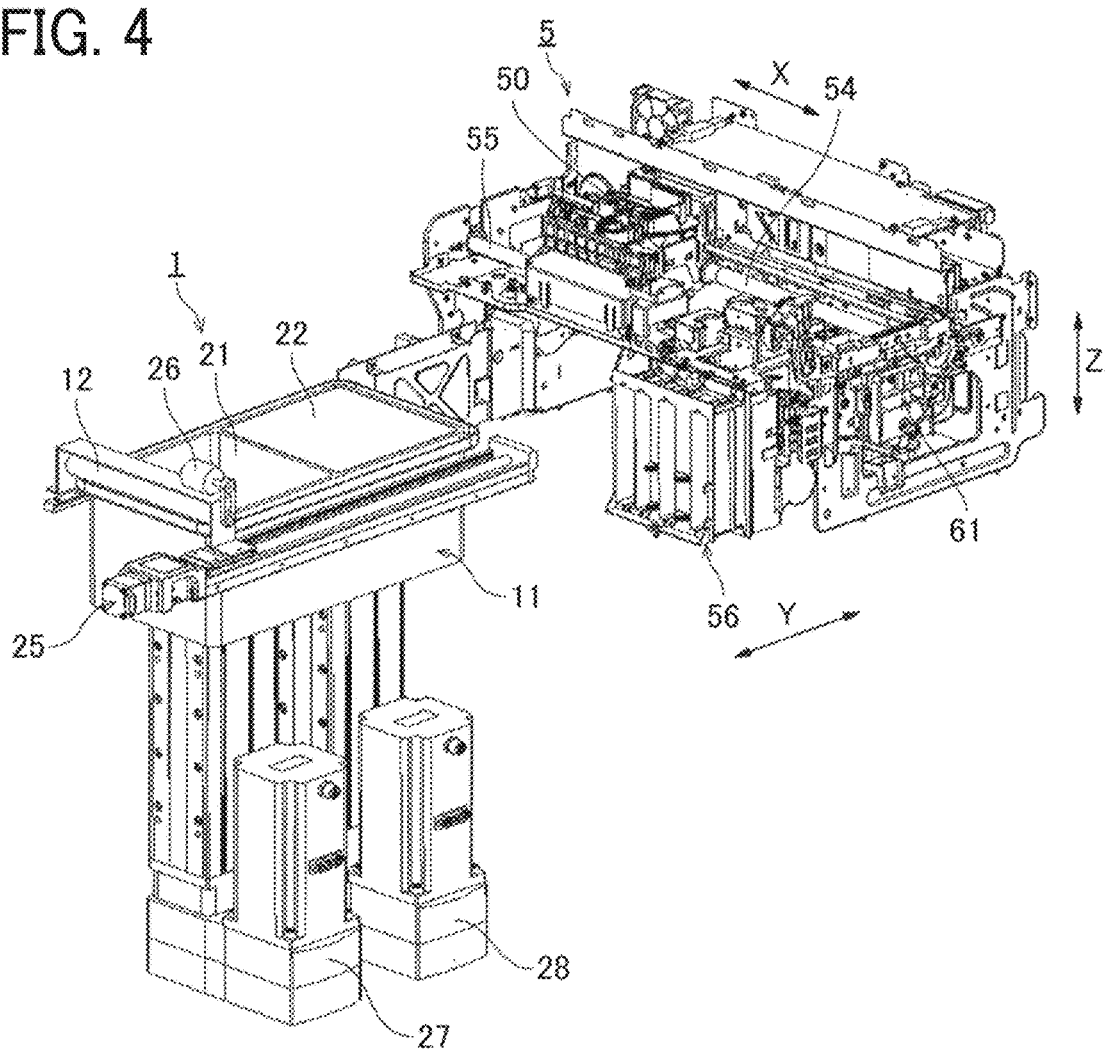
FIG. 4 is a perspective view illustrating a part of the three-dimensional fabrication apparatus according to the present embodiment.
Figure 5:
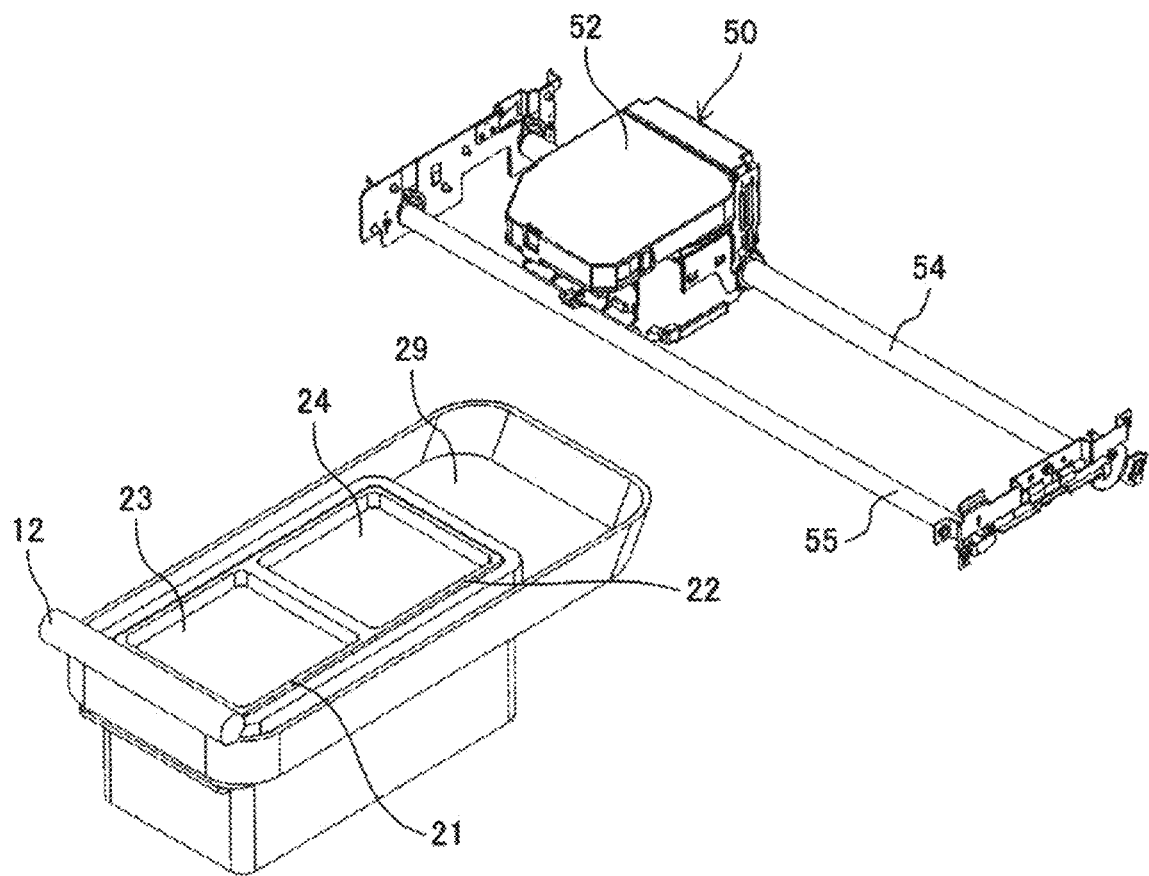
FIG. 5 is a perspective view of the fabrication section included in the three-dimensional fabrication apparatus according to the present embodiment.

FIG. 1 is a schematic plan view of a three-dimensional fabrication apparatus 100 according to an embodiment of the present disclosure. FIG. 2 is a schematic side view of the three-dimensional fabrication apparatus 100 according to the present embodiment. FIG. 3 is a cross-sectional view of a fabrication section 1 included in the three-dimensional fabrication apparatus 100 according to the present embodiment. Note that FIG. 3 illustrates the fabrication section 1 in which a three-dimensional object is being fabricated. FIG. 4 is a perspective view illustrating a part of the three-dimensional fabrication apparatus 100 according to the present embodiment. FIG. 5 is a perspective view of the fabrication section 1 included in the three-dimensional fabrication apparatus 100 according to the present embodiment.

The three-dimensional fabrication apparatus 100 is an example of a layer forming apparatus according to the present embodiment and includes the fabrication section 1 in which a fabrication layer 30 (see FIG. 3) is formed. The fabrication layer 30 is a layered object formed of bonded powder such as coating powder. The three-dimensional fabrication apparatus 100 further includes a fabrication unit 5. The fabrication unit 5 discharges fabrication liquid 10 to a powder layer 31 spread in a layer in the fabrication section 1 to fabricate a three-dimensional object as illustrated in FIG. 3. The fabrication section 1 includes a powder chamber 11 and a flattening roller 12. The flattening roller 12 is a rotator serving as a flattening member (recoater). The flattening member may be, for example, a plate member (blade) instead of the rotator.

The powder chamber 11 includes a supply chamber 21 to supply powder 20 and a fabrication chamber 22 in which fabrication layers 30 are laminated to fabricate a three-dimensional object. The fabrication chamber 22 is an example of a loading unit to which powder is supplied, and the supply chamber 21 is an example of a supply unit that stores powder to be supplied to the loading unit. A bottom portion of the supply chamber 21 acts as a supply stage 23 and is movable in a vertical direction (height direction). Similarly, a bottom portion of the fabrication chamber 22 acts as a fabrication stage 24 and is movable in the vertical direction (height direction). The fabrication layers 30 are laminated on the fabrication stage 24, so that a three-dimensional object including the fabrication layers 30 is fabricated on the fabrication stage 24. For example, as illustrated in FIG. 4, a motor 27 moves the supply stage 23 upward and downward in a direction (height direction or Z direction) indicated by arrow Z. Likewise, a motor 28 moves the fabrication stage 24 upward and downward in the Z direction.

The flattening roller 12 is an example of a roller device. The flattening roller 12 supplies the powder 20 supplied onto the supply stage 23 of the supply chamber 21 to the fabrication chamber 22 and flattens the powder 20 in the fabrication chamber 22 to form the powder layer 31. The flattening roller 12 is disposed extending in a direction (X direction) indicated by arrow X in FIG. 4, which is a direction along a stage surface (a surface on which the powder 20 is loaded) of the fabrication stage 24. A reciprocal moving assembly 25 reciprocally moves the flattening roller 12 relative to the stage surface of the supply stage 23 and the fabrication stage 24 in a direction (Y direction) indicated by arrow Y in FIG. 4. A motor 26 can rotate the flattening roller 12 in a forward direction and a counter direction with respect to the moving direction of the flattening roller 12.

The fabrication unit 5 includes a liquid discharge unit 50 that selectively discharges any of multiple fabrication liquids 10 to a selected portion of the powder layer 31 on the fabrication stage 24 to form the fabrication layer 30. The liquid discharge unit 50 includes a carriage 51 and two liquid discharge heads 52a and 52b (hereinafter, simply referred to as "head(s) 52" unless distinguished) mounted on the carriage 51. In FIG. 1, the two heads 52 are illustrated. However, in other embodiments, the number of liquid discharge heads may be one, or three or more.

The carriage 51 is movably supported by guides 54 and 55. The guides 54 and 55 are held by side plates 70 on both sides so as to be movable up and down. An X-direction scanning assembly 550 (see FIG. 6) described later reciprocally moves the carriage 51 in the X direction. The X-direction scanning assembly 550 includes a motor, a pulley, and a belt. The X direction is the same as the main scanning direction. Each of the two heads 52a and 52b includes two nozzle rows in each of which a plurality of nozzles is arranged to discharge liquid. Two nozzle rows of one head 52a discharge, for example, fabrication liquid A and fabrication liquid B. Two nozzle rows of the other head 52b discharge, for example, fabrication liquid C and fabrication liquid D. Note that the configuration of the head 52 is not limited to the above-described configuration.

The composition of the fabrication liquid is not limited, and the fabrication liquids A, B, C, and D may be the same or may be a combination of liquids including different cross-linkers (crosslinker-containing liquids). A plurality of tanks 60 is mounted on a tank mount 56 and stores the fabrication liquid A, the fabrication liquid B, the fabrication liquid C, and the fabrication liquid D, respectively. The fabrication liquids A, B, C, and D are supplied to the heads 52a and 52b via supply tubes. The carriage 51 integrally includes a post powder supply unit that supplies powder 20 to at least a portion to which fabrication liquid 10 has adhered when one fabrication layer 30 is formed in the fabrication chamber 22.

Further, a maintenance assembly 61 for maintaining and recovering the heads 52 of the liquid discharge unit 50 is disposed on one side (right side in FIG. 1) in the X direction. The maintenance assembly 61 includes caps 62 and a wiper 63. The caps 62 are brought into close contact with the nozzle surface (a surface on which the nozzles are arranged) of the head 52, and suck fabrication liquid 10 from the nozzles to discharge high-viscosity fabrication liquid 10 and powder 20 blocking the nozzles. Then, the wiper 63 wipes the nozzle surface to form meniscus of fabrication liquid 10 in the nozzles, in which the pressure is negative. When the fabrication liquid 10 is not discharged, the maintenance assembly 61 covers the nozzle surfaces of the heads 52 with the caps 62 to prevent powder 20 from entering the nozzles and to prevent the fabrication liquid 10 from drying.

The fabrication unit 5 includes a slider 72 slidably supported by a guide 71 disposed above a base 7. The entire fabrication unit 5 is reciprocally movable in the Y direction (sub-scanning direction) perpendicular to the X direction. A Y-direction scanning assembly 552 (see FIG. 6) described later reciprocally moves the entire fabrication unit 5 in the Y direction. The liquid discharge unit 50 is movable upward and downward in the Z direction together with the guides 54 and 55. A Z-direction elevating assembly 551 (see FIG. 6) described later raises and lowers the liquid discharge unit 50 in the Z direction.

Configuration of Fabrication Section

The powder chamber 11 has a box shape and includes two open-topped chambers, the supply chamber 21 and the fabrication chamber 22. The supply stage 23 is vertically movable inside the supply chamber 21, and the fabrication stage 24 is vertically movable inside the fabrication chamber 22. The relation between a powder amount a1 supplied from the supply chamber 21 and a volume (powder amount a2) of the fabrication chamber 22 satisfies an expression "a1>1.01×a2." Side faces of the supply stage 23 contact inner side faces of the supply chamber 21. Side faces of the fabrication stage 24 contact inner side faces of the fabrication chamber 22. The upper surfaces of the supply stage 23 and the fabrication stage 24 are kept horizontal.

As illustrated in FIG. 5, a surplus powder chamber 29 is disposed adjacent to the fabrication chamber 22 and around the supply chamber 21 and the fabrication chamber 22. The surplus powder chamber 29 has a recessed shape which is open-topped. The surplus powder chamber 29 receives surplus powder 20S (see FIGS. 8A and 8B) fallen from the fabrication chamber 22 among the powder 20 supplied by the flattening roller 12 when the powder layer 31 is being formed in the fabrication chamber 22. The surplus powder 20S fallen into the surplus powder chamber 29 is returned to a powder supply device 554 (see FIG. 6), which is described later, to supply the powder 20 to the supply chamber 21. The surplus powder chamber 29 is an example of a receiving unit that receives the surplus powder 20S spilled from the fabrication chamber 22.

The powder supply device 554 is disposed above the supply chamber 21. The powder supply device 554 supplies powder 20 in a tank of the powder supply device 554 to the supply chamber 21 at the time of an initial operation of a fabrication process or when an amount of the powder 20 in the supply chamber 21 decreases. Examples of a method of a powder conveyance for supplying the powder 20 include a screw conveyor system using a screw and an air conveyance system using air.

The flattening roller 12 transfers and supplies powder 20 from the supply chamber 21 to the fabrication chamber 22 and smooths and flattens the surface of the powder 20 to form the powder layer 31 which is a layered powder having a desired thickness. The flattening roller 12 has a rod shape longer than an inside dimension of the fabrication chamber 22 and the supply chamber 21 (that is, a width of a portion to which the powder 20 is supplied or stored). The reciprocal moving assembly 25 reciprocally moves the flattening roller 12 in the Y direction (sub-scanning direction) along the stage surface. The flattening roller 12 horizontally moves to pass through an area above the supply chamber 21 and the fabrication chamber 22 from an outside of the supply chamber 21 while being rotated by the motor 26. Accordingly, the powder 20 is transferred and supplied into the fabrication chamber 22, and the flattening roller 12 flattens the powder 20 while passing over the fabrication chamber 22, thus forming the powder layer 31.

Further, as illustrated in FIG. 2, a powder removal plate 13 contacts the circumferential surface of the flattening roller 12 to remove powder 20 adhering to the flattening roller 12. The powder removal plate 13 moves together with the flattening roller 12 while contacting the circumferential surface of the flattening roller 12, thereby removing the powder 20 adhering to the flattening roller 12. The powder removal plate 13 contacts the flattening roller 12 against the rotation direction of the flattening roller 12 which is flattening the powder 20.

In the present embodiment, the powder chamber 11 of the fabrication section 1 includes two chambers of the supply chamber 21 and the fabrication chamber 22. Alternatively, the powder chamber 11 may include only the fabrication chamber 22, and powder 20 may be supplied from a powder supply device to the fabrication chamber 22 and flattened by the flattening member.

Electrical Configuration of Three-Dimensional Fabrication Apparatus

Figure 6:
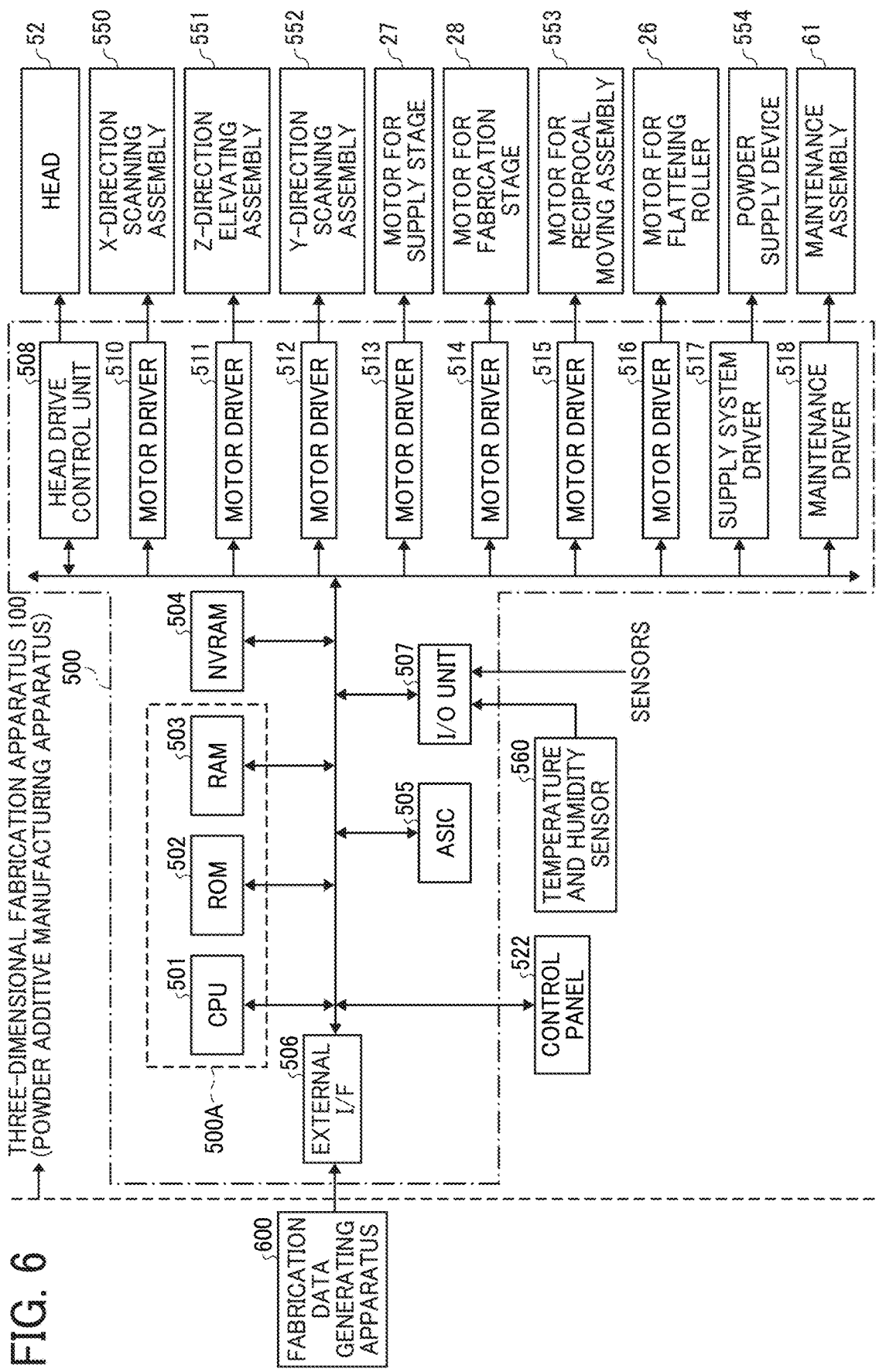
FIG. 6 is a block diagram of the three-dimensional fabrication apparatus according to the present embodiment.

FIG. 6 is a block diagram of the three-dimensional fabrication apparatus 100 according to the present embodiment. As illustrated in FIG. 6, a controller 500 includes a main controller 500A including a central processing unit (CPU) 501, a read only memory (ROM) 502, and a random access memory (RAM) 503. The CPU 501 controls the entire system of the three-dimensional fabrication apparatus 100. The ROM 502 stores programs, which include a program to cause the CPU 501 to perform the control of fabricating a three-dimensional object, and other fixed data. The RAM 503 temporarily stores fabrication data and the like. The controller 500 further includes a nonvolatile RAM (NVRAM) 504 that retains data while the apparatus is powered off. The controller 500 further includes an application specific integrated circuit (ASIC) 505 to perform image processing in which various signals are processed on image data and processing of input and output signals for controlling the entire apparatus.

The controller 500 further includes an external interface (I/F) 506 to send and receive data and signals when the controller 500 receives fabrication data from a fabrication data generating apparatus 600 (an external device). The fabrication data generating apparatus 600 generates fabrication data in which a final-form object (three-dimensional object) is sliced in multiple fabrication layers. A data processor such as a personal computer is used as the fabrication data generating apparatus 600.

The controller 500 further includes an input-output (I/O) unit 507 to receive detection signals of various sensors. The controller 500 further includes a head drive control unit 508 to control driving of the head 52 of the liquid discharge unit 50. The controller 500 further includes a motor driver 510 that drives a motor included in the X-direction scanning assembly 550 and a motor driver 512 that drives a motor included in the Y-direction scanning assembly 552. The X-direction scanning assembly 550 moves the carriage 51 of the liquid discharge unit 50 in the X direction (main scanning direction). The Y-direction scanning assembly 552 moves the fabrication unit 5 in the Y direction (sub-scanning direction).

The controller 500 further includes a motor driver 511 that drives a motor included in the Z-direction elevating assembly 551. The Z-direction elevating assembly 551 moves (raises and lowers) the carriage 51 of the liquid discharge unit 50 in the Z direction. The Z-direction elevating assembly 551 may move (raises and lowers) the entire fabrication unit 5 in the Z-direction. The controller 500 further includes a motor driver 513 that drives the motor 27 for raising and lowering the supply stage 23 and a motor driver 514 that drives the motor 28 for raising and lowering the fabrication stage 24. The controller 500 further includes a motor driver 515 that drives a motor 553 of the reciprocal moving assembly 25 for moving the flattening roller 12 and a motor driver 516 that drives the motor 26 for rotating the flattening roller 12.

The controller 500 further includes a supply system driver 517 that drives the powder supply device 554 that supplies powder 20 to the supply chamber 21 and a maintenance driver 518 that drives the maintenance assembly 61 of the liquid discharge unit 50. Detected signals of a temperature and humidity sensor 560 that detects the temperature and the humidity as the environment condition of the apparatus and detected signals of other sensors are input into the I/O unit 507 of the controller 500. The controller 500 is connected to a control panel 522 to input and display data necessary for the apparatus.

The fabrication data generating apparatus 600 and the three-dimensional fabrication apparatus (powder additive manufacturing apparatus) 100 construct a three-dimensional fabrication system.

Operation of Fabricating Three-Dimensional Object

FIGS. 7A to 7F are schematic views illustrating operations of fabricating a three-dimensional object in the three-dimensional fabrication apparatus 100 according to the present embodiment. FIGS. 7A to 7F also illustrate an example of a fabrication process according to the present embodiment. FIG. 7A illustrates the fabrication section 1 in which a first fabrication layer 30 has been formed on the fabrication stage 24 of the fabrication chamber 22. When a second fabrication layer 30 is formed on the first fabrication layer 30, as illustrated in FIG. 7A, the supply stage 23 of the supply chamber 21 is raised in the direction indicated by arrow Z1, and the fabrication stage 24 of the fabrication chamber 22 is lowered in the direction indicated by arrow Z2. At this time, a lowering distance of the fabrication stage 24 is set so that a distance between an upper surface of the fabrication chamber 22 (surface of powder 20) and a lower end of the flattening roller 12 (lower tangential portion) becomes Δt1. The distance Δt1 corresponds to the thickness of the powder layer 31 to be subsequently formed. As an example, the distance Δt1 is about several tens μm to about 100 μm.

Next, as illustrated in FIG. 7B, the flattening roller 12 transfers powder 20 upper than the level of an upper surface of the supply chamber 21 in the direction indicated by arrow Y2 (i.e., a first direction Y1) toward the fabrication chamber 22 while rotating in the counter direction indicated by arrow R (counterclockwise CCW in FIG. 7B). Thus, the powder 20 is transferred and supplied into the fabrication chamber 22 (powder supply).

Next, as illustrated in FIG. 7C, the flattening roller 12 moves in parallel to the stage surface of the fabrication stage 24 of the fabrication chamber 22 (flattening). As a result, a powder layer 31 having a predetermined distance (thickness) Δt1 is formed over the fabrication layer 30 on the fabrication stage 24 as illustrated in FIG. 7D.

The flattening roller 12 is movable while maintaining a constant distance from the level of the upper surface of the fabrication chamber 22 and the supply chamber 21. Such a configuration can form the powder layer 31 having a uniform thickness Δt1 on the fabrication stage 24 of the fabrication chamber 22 or on the fabrication layer 30 already formed on the fabrication stage 24 while transferring the powder 20 to an area on the fabrication chamber 22 with the flattening roller 12. That is, the controller 500 illustrated in FIG. 6 causes the flattening roller 12 to rotate while contacting the powder 20 supplied to the fabrication chamber 22 and to move in the first direction Y1 which is parallel to the surface of the fabrication stage 24, thereby forming the powder layer 31 (i.e., a first step).

After the powder layer 31 is formed, as illustrated in FIG. 7D, the supply stage 23 of the supply chamber 21 and the fabrication stage 24 of the fabrication chamber 22 are lowered in the direction indicated by arrow Z2 so as to lower the upper surface of the supply chamber 21 (the surface of the powder 20) and the upper surface of the fabrication chamber 22 (the surface of the powder layer 31).

Thereafter, the flattening roller 12 moves in the direction indicated by arrow Y1 (i.e., a second direction Y2) and returns to the initial position. At this time, the upper surface of the supply chamber 21 (the surface of the powder 20) and the upper surface of the fabrication chamber 22 (the surface of the powder layer 31) are lowered so as not to contact the flattening roller 12 moving in the second direction Y2. After the flattening roller 12 returns to the initial position, as illustrated in FIG. 7E, the supply stage 23 of the supply chamber 21 and the fabrication stage 24 of the fabrication chamber 22 are raised in the direction indicated by arrow Z1.

Then, as illustrated in FIG. 7F, the head 52 of the liquid discharge unit 50 discharges and applies droplets of the fabrication liquid 10 to the powder layer 31 to form and laminate the next fabrication layer 30 in the powder layer 31 (fabrication). For example, as the fabrication liquid 10 discharged from the head 52 is mixed with the powder 20, adhesives contained in the powder 20 are dissolved, and the dissolved adhesives are bonded together to bind the powder 20, thereby forming the fabrication layer 30.

Subsequently, the step of forming the powder layer 31 by the above-described powder supply and flattening processes and the step of discharging the fabrication liquid 10 with the head 52 are performed again to form a new fabrication layer 30. At this time, the newly-formed upper fabrication layer 30 and the preceding lower fabrication layer 30 are united to form a part of a three-dimensional fabrication object. Thereafter, the step of forming the powder layer 31 by the powder supply and flattening processes and the step of discharging the fabrication liquid 10 with the head 52 are repeated a desired number of times to complete the three-dimensional object. That is, the fabrication liquid 10 is applied to each layer of the powder 20 spread in a layer (each powder layer 31), and a portion of the powder to which the fabrication liquid 10 is applied is cured (solidified) to form the fabrication layer 30. The fabrication layer 30 thus formed are sequentially laminated to form a three-dimensional object. The head 52 is an example of a solidification unit that solidifies the powder 20. Any type of the solidification unit that can solidify a selected portion of the powder layer 31 can be used. For example, the solidification unit may emit laser light to sinter the powder 20 or to melt the powder 20.

Powder Material for Three-Dimensional Fabrication

Next, examples of a powder material for fabricating the three-dimensional object and fabrication liquid used in the three-dimensional fabrication apparatus 100 are described. The powder material and the fabrication liquid are not limited to the examples described below.

The powder material for the three-dimensional fabrication includes a base material and a soluble organic material. The base material is coated with the soluble organic material having the average thickness of 5 nm to 1000 nm. The soluble organic material is dissolved and becomes cross-linkable by the effect of the crosslinker-containing liquid serving as fabrication liquid. Accordingly, when the crosslinker-containing liquid is applied to the soluble organic material, the soluble organic material is dissolved and cross-linked by the effect of the cross-linker contained in the crosslinker-containing liquid.

Thus, as a thin layer (powder layer 31) is formed of the above-described powder material for the three-dimensional fabrication and the crosslinker-containing liquid as the fabrication liquid 10 is discharged onto the powder layer 31, the dissolved soluble organic material is cross-linked in the powder layer 31, and the powder layer 31 is bonded and cured, thereby forming the fabrication layer 30.

At this time, the base material is coated with the soluble organic material having the average thickness of 5 nm to 1000 nm. Therefore, when the soluble organic material is dissolved, the minimum amount of the soluble organic material required for the three-dimensional fabrication is present around the base material, and the soluble organic material is cross-linked to form a three-dimensional network. As a result, the powder layer 31 is cured with high dimensional accuracy and good strength.

By repeating the above-described steps, a complicated three-dimensional object can be formed simply and efficiently with high dimensional accuracy without being out of shape before sintering or the like. The soluble organic material may be present in powder 20, and the fabrication liquid 10 is applied to the powder 20 to cross-link the soluble organic material, thereby forming a three-dimensional object. The soluble organic material may be mixed with the base material instead of coating the base material with the soluble organic material. In another embodiment, powder 20 may include only the base material, and the fabrication liquid containing the soluble organic material may be applied to the powder 20, thereby forming a three-dimensional object.

Base Material

The base material is not particularly limited as long as the base material has a form of powder or particles, and can be suitably selected to suit to a particular application. Examples of the base material include metals, ceramics, carbon, polymers, and the like. From the viewpoint of obtaining a three-dimensional object having high strength, metals and ceramics that can be finally sintered are preferable.

The metal is not particularly limited as long as the material contains a metal. Examples of the metal includes a sinter-resistant material such as aluminum (Al), titanium (Ti), copper (Cu), and further includes magnesium (Mg), and vanadium (V), chromium (Cr), manganese (Mn), iron (Fe), cobalt (Co), nickel (Ni), zinc (Zn), yttrium (Y), zirconium (Zr), niobium (Nb), molybdenum (Mo), lead (Pb), silver (Ag), indium (In), tin (Sn), tantalum (Ta), tungsten (W), neodymium (Nd), and alloys of the metals described above. Among these metals, steel use stainless (SUS), iron (Fe), copper (Cu), silver (Ag), titanium (Ti), aluminum (Al), and alloys thereof are preferable. The sinter-resistant material such as aluminum (Al), titanium (Ti), and copper (Cu), and alloys thereof are more preferable. Examples of the aluminum alloy include AlSi10Mg, AlSi12, AlSi7Mg0.6, AlSi3Mg, AlSi9Cu3, SCALMALLOY, and ADC12. Each of these materials can be used alone or in combination with others.

Examples of the ceramics include oxides, carbides, nitrides, hydroxides, and the like. Examples of the oxides include, but are not limited to, metal oxides. Examples of the metal oxides include silica ($SiO_2$), alumina ($Al_2O_3$), zirconia ($ZrO_2$), titania ($TiO_2$), and the like. However, the above-described materials are only examples, and the present disclosure is not limited to the examples described above. Each of these materials can be used alone or in combination with others. Examples of the carbon include graphite, graphene, carbon nanotubes, carbon nanohorns, and fullerene. Each of these materials can be used alone or in combination with others. In addition, the surface of the base material may be modified by a certain surface treatment to improve the affinity for the soluble organic material.

A commercially available product can be used for the base material. Examples of the commercially available product include pure Al (e.g., A1070-30BB available from Toyo Aluminum K.K.), pure Ti (available from OSAKA Titanium technologies Co., Ltd.), SUS316L (e.g., trade name: PSS316L available from Sanyo Special Steel Co., Ltd.), AlSi10Mg (e.g., Si10Mg30BB available from Toyo Aluminum K.K.), $SiO_2$ (e.g., trade name EXCELICA SE-15K available from Tokuyama Corporation), $Al_2O_3$ (e.g., trade name TAIMICRON TM-5D available from TAIMEI CHEMICALS CO., LTD.), $ZrO_2$ (e.g., trade name TZ-B53 available from Tosoh Corporation), and the like.

The base material may be subjected to a surface treatment (surface modification treatment) to improve adhesion to a resin and to improve coating properties. The volume average particle diameter of the base material is not particularly limited and can be suitably selected to suit to a particular application, but is preferably from 2 μm to 80 μm, more preferably from 8 μm to 50 μm. The volume average particle diameter of the base material of 2 μm or more can prevent an increase of an influence of aggregation and facilitate resin coating on the base material. Thus, the base material having the volume average particle diameter of 2 μm or more can prevent a reduction in yield, a reduction in production efficiency of the fabrication product, and deterioration of handleability of the base material. Further, when a thin layer is formed of a powder material for the three-dimensional fabrication, the volume average particle diameter of the base material of 80 μm or less can increase the filling factor of the powder material for three-dimensional fabrication in the thin layer. Accordingly, the three-dimensional object thus fabricated is less likely to have void areas. A particle size distribution of the base material is not particularly limited and may be suitably selected to suit to a particular application. However, a shaper particle size distribution is preferable. The outer shape, surface area, circularity, fluidity, and wettability of the base material can be suitably selected to suit to a particular application.

The base material can be produced by a conventionally known method. As a method for producing a powder-shaped or particle-shaped base material, for example, there are pulverization in which a solid is fragmented by applying compression, impact, friction or the like, atomization in which a melted base material is sprayed and rapidly cooled to obtain a quenched powder, precipitation in which a component dissolved in a liquid is precipitate, and a gas-phase reaction in which the base material is vaporized and crystalized, and the like. The base material is not limited by the production method, but the atomization method is preferable because a spherical shape can be obtained and a variation in particle diameter is small. Examples of the atomization include water atomization, gas atomization, centrifugal atomization, plasma atomization, and the like, and any one of the methods described-above is suitably used.

Soluble Organic Material

As the soluble organic material, a material having properties of being dissolved in a fabrication liquid and being cross-linkable by the effect of the cross-linker can be used. In other words, the soluble organic material is not particularly limited and may be suitably selected to suit to a particular application as long as the soluble organic material is soluble in the fabrication liquid and cross-linkable by the cross-linker. A resin as the soluble organic material is described below.

Any resin can be used as long as the resin has a reactive functional group, is soluble in liquid for forming a cured product (i.e., a curing liquid), and can react with a cross-linker contained in the curing liquid to form a cross-linked structure by a covalent bond. The resin having a solubility means that, for example, 90% by mass or more of the resin is dissolved in the solvent when 1 g of the resin is mixed with 100 g of the solvent included in the curing liquid at 30° C. and is stirred.

Preferably, the resin has low reactivity with powder of a highly active metal as the base material, is soluble in an organic solvent before being cured, and is insoluble in the organic solvent after being cured (cross-linked). More preferably, the resin is soluble in an organic solvent having low solubility in water. When the resin has low reactivity with powder of a highly active metal as the base material, is soluble in an organic solvent before the curing liquid is applied, and is insoluble in the organic solvent after the curing liquid is applied (after being cross-linked), the resin is adaptable for the soluble organic material even if the base material is a highly active metal, that is, a water-prohibited material (for example, aluminum, titanium, and the like), and the produced three-dimensional object can be prevented from collapsing even when immersed in a solution including an organic solvent.

The reactive functional group is not particularly limited as long as the reactive functional group can react with a cross-linker to form a covalent bond, and can be suitably selected to suit to a particular application. Examples of the reactive functional group include a hydroxyl group, a carboxyl group, an amide group, a phosphate group, a thiol group, an acetoacetyl group, an ether linkage, and the like. Among these groups, the resin preferably has a hydroxyl group in terms of improving the adhesion to the base material and the reactivity with the cross-linker. Preferably, 95% by mass or more of the resin is pyrolyzed when the resin alone is heated at 450° C. in order to prevent the resin from remaining in the three-dimensional object and causing sintering inhibition during sintering.

Examples of the resin include polyvinyl acetal (glass transition temperature (Tg): 107° C.), polyvinyl butyral (Tg: 67° C.), polyacrylic polyol (Tg: 80° C.), polyester polyol (Tg: 133° C.), polybutadiene polyol (Tg: —17° C.), ethyl cellulose (Tg: 145° C.), nitrocellulose (Tg: 50° C.), and the like. Examples of the resin further include partially saponified products of vinyl acetate copolymer (e.g., vinyl chloride-vinyl acetate copolymer and ethylene-vinyl acetate copolymer), polyether polyol, and phenolic polyol. Each of these materials can be used alone or in combination with others.

Next, the resin that has not yet been crosslinked is described below. The resin is not particularly limited as long as the resin has a solubility in water of 0.5 (g/100 g of $H_2O$) or less, which means that the resin is dissolved in the range of 0.5 g or less in 100 g of water at 25° C. Examples of the resin include acrylic, acrylic polyol, polyester, epoxy, polyol, urethane, polyether, polyvinyl butyral, polyvinyl acetal, polyvinyl chloride, vinyl acetate, paraffin, olefin, ethyl cellulose, and the like.

Further, the resin is not particularly limited as long as the resin is soluble in the organic solvent contained in ink. The resin may be a homopolymer or a heteropolymer (copolymer) and may be modified, or a known functional group may be introduced to the resin. Each of these materials can be used alone or in combination with others. The weight average molecular weight of a non-aqueous resin is preferably 150,000 or less, more preferably 20,000 or more and 100,000 or less. The non-aqueous resin having the weight average molecular weight of 100,000 or less is preferably solid at room temperature.

A commercially available product can be used for the non-aqueous resin. Examples of the commercially available product include polyvinyl butyral (e.g., BM-5 available from SEKISUI CHEMICAL CO., LTD.), copolymer of vinyl acetate and vinyl chloride (e.g., SOLBIN A available from Nissin Chemical Industry Co., Ltd.), polyester polyol (e.g., SUNDHOMA formerly known as POLYLITE OD-X-668 available from DIC Corporation, ADEKA NEW ACE YG-108 available from ADEKA Corporation, and the like), polybutadiene polyol (e.g., GQ-1000 available from Nippon Soda Co., Ltd.), polyvinyl butyral and polyvinyl acetal (S-LEC BM-2 and KS-1 available from SEKISUI CHEMICAL CO., LTD., MOWITAL B20H available from Kuraray Co., Ltd.), polyacrylic polyol (e.g., ACRYDIC WFU-580 available from DIC Corporation), and ethyl cellulose (e.g., ETHOCEL available from Nisshin Kasei Co., Ltd.).

Crosslinker-Containing Liquid

The crosslinker-containing liquid as fabrication liquid is not particularly limited as long as liquid includes a crosslinker in a liquid medium, and is suitably selected to suit to a particular application. The crosslinker-containing liquid may include other components appropriately selected as necessary in addition to the liquid medium and the crosslinker. The other components can be appropriately selected in consideration of various conditions such as the type of a device for applying the crosslinker-containing liquid, frequency of use, and an amount of the crosslinker-containing liquid. For example, when the crosslinker-containing liquid is applied by a liquid discharge method, the crosslinker-containing liquid can be selected in consideration of the influence of clogging or the like of the nozzles of the liquid discharge head 52. The curing liquid as the crosslinker-containing liquid is described below.

Curing Liquid

The curing liquid includes a curing agent bondable to the reactive functional group by a covalent bond, preferably includes a first organic solvent, and further includes other components as necessary.

Curing Agent

The curing agent is bondable to the reactive functional group by a covalent bond. The curing agent forms a covalent bond with the reactive functional group of the resin to form a cross-linked structure, thereby enhancing the strength of the fabricated three-dimensional object and improving the solvent resistance of the fabricated three-dimensional object. In the present specification, the "curing agent" is synonymous with "cross-linker."

The curing agent is a compound including two or more isocyanate groups at the molecular ends. Examples of the compound including two or more isocyanate groups at the molecular ends include, but are not limited to, diisocyanate, polyisocyanate, and the like.

Examples of the diisocyanate include, but are not limited to: aromatic diisocyanate such as tolylene diisocyanate (TDI), diphenylmethane diisocyanate (MDI), tolidine diisocyanate (TODI), naphthalene diisocyanate (NDI), xylylene diisocyanate (XDI), and paraphenylene diisocyanate; aliphatic isocyanate such as isophorone diisocyanate (IPDI), 1,3-bis(isocyanatomethyl)cyclohexane (H6XDI), hexamethylene diisocyanate (HDI), and pentamethylene diisocyanate (PDI); other diisocyanates such as lysine diisocyanate (LDI) and tetramethylxylene diisocyanate (TMXDI); and adducts of the above-described diisocyanate with diol compound.

Examples of polyisocyanate include adducts of the above-described diisocyanate with triol, biuret, allophanate, and isocyanurate. The compound having two or more isocyanate groups at the molecular ends may be a commercially available product. Examples of the commercially available product include TAKENATE D110N, D120N, D140N, D160N, D165N, D178NL, D103H, and D204EA-1 and STABIO D370N and D376N available from Mitsui Chemicals, Inc., DURANATE D101, D201, and A201H available from Asahi Kasei Corporation, and the like. Each of the commercially available products can be used alone or in combination with others.

The content of the curing agent in the total amount of the curing liquid is not limited to any particular value and varied in accordance with the intended purpose. The proportion of the curing agent is preferably 1.0% by mass or more, more preferably 5.0% by mass or more, and still more preferably 5.0% by mass or more and 50% by mass or less. When the proportion of the curing agent to the total amount of the curing liquid is 1.0% by mass or more and 50% by mass or less, the curing liquid prevents the fabricated three-dimensional object from being understrength.

First Organic Solvent

The first organic solvent is a liquid component that keeps the curing liquid in a liquid state at room temperature. The first organic solvent preferably has a saturated vapor pressure of 2,000 Pa or less at 25° C. and is more preferably insoluble or slightly soluble in water. In this specification, being insoluble or slightly soluble in water means that the solubility in water is 80 g/L or less. The first organic solvent having the saturated vapor pressure of 2,000 Pa or less at 25° C. prevents the nozzle from drying when the apparatus is not operating (on standby), thereby improving the discharge stability.

Further, the first organic solvent preferably can dissolve 1% by mass or more of the resin contained in the powder material for three-dimensional fabrication at 25° C., and more preferably can dissolve 5% by mass or more of the resin. Since the first organic solvent can dissolve 1% by mass or more of the resin contained in the powder material for three-dimensional fabrication at 25° C., the strength of the three-dimensional object before sintering can be improved.

Examples of the first organic solvent include aliphatic hydrocarbon or aromatic hydrocarbon such as n-octane (boiling point (bp): 125.6° C., saturated vapor pressure (Psat): 1. 86 kPa at 25° C.), m-xylene (bp: 139° C., Psat: 0.8 kPa at 20° C.), and solvent naphtha (bp: 150° C. or higher, Psat: 0.1 kPa to 1.4 kPa at 20° C.); ketone such as diisobutyl ketone (bp: 168° C., Psat: 0.23 kPa at 20° C.), 3-heptanone (bp: 146° C. to 149° C., Psat: 1.4 kPa at 25° C.), 2-octanone (bp: 172.5° C., Psat: 1.35 kPa at 25° C.), and acetylacetone (bp: 138° C., Psat: 0.93 kPa); ester such as butyl acetate (bp: 126° C., Psat: 1.53 kPa at 25° C.), amyl acetate (bp: 142° C., Psat: 0.747 kPa at 25° C.), n-hexyl acetate (bp: 168° C. to 170° C., Psat: 0.5 kPa at 20° C.), n-octyl acetate (bp: 210° C.), ethyl butyrate (bp: 121° C., Psat: 0.17 kPa at 20° C.), ethyl valerate (bp: 145° C.), ethyl caprylate (bp: 208° C., Psat: 0.2 kPa at 20° C.), ethyl octanoate (bp: 208° C., Psat: 0.003 kPa at 25° C.), ethyl acetoacetate (bp: 181° C., Psat: 0.1 kPa at 20° C.), ethyl 3-ethoxypropionate (bp: 166° C., Psat: 0.2 kPa at 25° C.), diethyl oxalate (bp: 182° C. to 186° C., Psat: 0.027 kPa at 20° C.), diethyl malonate (bp: 199° C., Psat: 0.13 kPa at 40° C.), diethyl succinate (bp: 215° C. to 217° C., Psat: 0. 133 kPa at 55° C.), diethyl adipate (bp: 245° C.), bis(2-ethylhexyl) maleate (bp: 173° C.), triacetin (bp: 258° C., Psat: 0.00033 kPa at 25° C.), tributyrin (bp: 190° C.), propylene glycol monomethyl ether acetate (bp: 146° C., Psat: 0.5 kPa), ethylene glycol monobutyl ether acetate (bp: 192° C., Psat: 0. 031 kPa at 25° C.); ether such as dibutyl ether (bp: 142° C., Psat: 0. 64 kPa at 25° C.), 1,2-dimethoxybenzene (bp: 206° C. to 207° C., Psat: 0.063 kPa at 25° C.), 1,4-dimethoxybenzene (bp: 213° C., Psat: less than 0.13 kPa at 25° C.), and diethylene glycol monobutyl ether (butyl carbitol, bp: 230° C., Psat: 0. 0013 kPa).

The first organic solvent is not particularly limited, and any compound not described above can also be suitably selected as the first organic solvent to suit to a particular application as long as the compound has the vapor pressure of 2,000 Pa or less at 25° C. and can dissolve 1% by mass of the resin contained in the powder material for three-dimensional fabrication. Each of these organic solvents can be used alone or in combination with others.

The proportion of the first organic solvent to the total amount of the curing liquid is preferably from 30% to 90% by mass, more preferably from 50% to 80% by mass. When the proportion of the first organic solvent to the total amount of the curing liquid is from 30% to 90% by mass, the solubility of the resin can be improved, and the three-dimensional object can be strengthened. The fabrication liquid including the above-described curing liquid can prevent the nozzles from drying when the apparatus is not operating (on standby), thereby suppressing nozzle clogging and nozzle missing.

Other Components

Other components are not particularly limited and can be suitably selected to suit to a particular application. Examples of other components includes a drying inhibitor, a viscosity adjusting agent, a surfactant, a penetrant, a defoamer, a pH adjuster, an antiseptic, a fungicide, a colorant, a preservative, a stabilizer, and the like. These known materials can be added to the curing liquid without limitation.

Preparation of Curing Liquid

Polyisocyanate made of hexamethylene diisocyanate (e.g., D160N available from Mitsui Chemicals, Inc.), which acts as a curing agent, is mixed with diethyl succinate (available from FUJIFILM Wako Pure Chemical Corporation), which acts as a first organic solvent so as to be 100 parts by mass all together. The proportion of the curing agent is adjusted to 23% by mass to the total amount of the curing liquid, and the mixture is dispersed for 30 minutes with a homomixer to prepare the curing liquid.

Measurement of Viscosity

The curing liquid 1.1 mL is dispensed to a viscometer TVE-25L manufactured by Toki Sangyo Co., Ltd. with a micropipette to measure the viscosity of the curing liquid. As the measurement starts, the measured viscosity stabilizes. Thereafter, the measurement continues, and the measured viscosity after 5 minutes is taken as the viscosity of the curing liquid.

Measurement of Surface Tension

The curing liquid 30 mL is dispensed into a petri dish, and the surface tension of the curing liquid is measured with a surface tensiometer DY-300 manufactured by Kyowa Interface Science Co., Ltd. The surface tension measured by the Wilhelmy method using a platinum plate is taken as the surface tension of the curing liquid.

Sintering Process

In the sintering process according to the present embodiment, the green body formed by the fabrication apparatus is heated in a degreasing-and-sintering furnace at a temperature equal to or higher than the pyrolysis temperature of the resin to degrease the resin component in the green body (i.e., a degreasing step). A sintering step, in which the green body is heated and held at a higher temperature, follows the above-described degreasing step to sinter the green body, thereby fabricating a three-dimensional object (sintered body) that is the green body solidified in single piece.

Specifically, in the degreasing step, a resin component made of an acrylic material is decomposed at a temperature higher than the pyrolysis temperature thereof and lower than the melting point or solidus temperature of the core particle, for example. Depending on the resin component, the multiple set temperatures at which the green body is heated and held may be provided. Alternatively, a degreasing method by solvent extraction is also applicable, in which the green body is immersed in a solvent instead of being heated to extract the resin from the green body.

FIGS. 8A to 8D are schematic views illustrating an operation of the three-dimensional fabrication apparatus 100 according to the present embodiment except when forming a powder layer. FIG. 8A illustrates the fabrication chamber 22, on a right frame 22R and a left frame 22L of which the surplus powder 20S is deposited. The left frame 22L and the right frame 22R are disposed at the front and far ends of the fabrication chamber 22 in the second direction Y2 in which the flattening roller 12 moves. In this state, if the flattening roller 12 contacts the surplus powder 20S while moving, the surplus powder 20S may fall on the surface of the powder layer 31 formed in the fabrication chamber 22. As a result, the surface shape on the powder layer 31 may change. As the surface shape of the powder layer 31 changes, the surface shape of the fabrication layer 30 also changes, and the shape of the three-dimensional object may eventually change.

For this reason, in the present embodiment, the controller 500 illustrated in FIG. 6 causes the flattening roller 12 to move in the second direction Y2 as illustrated in FIG. 7E after the powder layer 31 is formed and to rotate while contacting the powder 20 not on the fabrication stage 24, which does not form the powder layer 31 (i.e., a second step). Accordingly, the powder 20 not forming the powder layer 31 can be moved in a desired direction by the flattening roller 12 moving in the second direction Y2 after the powder layer 31 is formed.

For example, the controller 500 controls the rotation direction of the flattening roller 12 so that the flattening roller 12 moves the powder 20 in contact with the flattening roller 12 away from the powder layer 31 when the flattening roller 12 moves in the second direction Y2. Specifically, the controller 500 controls the rotation direction of the flattening roller 12 so that the bottom surface of the flattening roller 12 contacting the powder 20 not forming the powder layer 31 moves away from the powder layer 31 when the flattening roller 12 moves in the second direction Y2.

More specifically, the controller 500 causes the flattening roller 12 to rotate counterclockwise (CCW) when the flattening roller 12 moves in the second direction Y2 and contacts the surplus powder 20S deposited on the right frame 22R, and causes the flattening roller 12 to rotate clockwise (CW) when the flattening roller 12 moves in the second direction and contacts the surplus powder 20S deposited on the left frame 22L as illustrated in FIG. 8A. As a result, after the powder layer 31 is formed, the flattening roller 12 moving in the second direction Y2 can move the powder 20 not forming the powder layer 31 away from the powder layer 31, thereby preventing the surplus powder 20S from impairing the flatness of the upper surface of the powder layer 31.

Further, the controller 500 causes the flattening roller 12 not to rotate when the flattening roller 12 moves above the powder layer 31 between the right frame 22R and the left frame 22L in the second direction Y2. As a result, when the flattening roller 12 moves above the powder layer 31 in the second direction Y2, the flattening roller 12 does not rotate and the powder 20 does not fall from the flattening roller 12 to the powder layer 31, thereby preventing the surplus powder 20S from impairing the flatness of the upper surface of the powder layer 31.

FIG. 8B illustrates the fabrication chamber 22 and the supply chamber 21 disposed adjacent to the left side of the fabrication chamber 22. The surplus powder 20S is deposited on the right frame 22R and the left frame 22L of the fabrication chamber 22 and on the left frame 21L of the supply chamber 21. The left frame 21L is disposed at the far end of the supply chamber 21 in the second direction Y2 in which the flattening roller 12 moves. The left frame 22L of the fabrication chamber 22 is also a right frame 21R of the supply chamber 21 disposed at the front end of the supply chamber 21 in the second direction Y2 in which the flattening roller 12 moves.

The controller 500 causes the flattening roller 12 to rotate when the flattening roller 12 moves on the supply chamber 21 in the second direction Y2. Accordingly, the powder 20 can be moved in a desired direction by rotating the flattening roller 12 that moves on the supply chamber 21 in the second direction Y2. For example, the controller 500 causes the flattening roller 12 to rotate while contacting the powder 20 on the left frame 21L and the right frame 21R of the supply chamber 21 and controls the rotation direction of the flattening roller 12 so that the flattening roller 12 moves the powder 20 in contact with the flattening roller 12 into the supply chamber 21 from the outside. As a result, the surplus powder 20S can be collected in the supply chamber 21.

Specifically, the controller 500 controls the rotation direction of the flattening roller 12 so that the bottom surface of the flattening roller 12 contacting the powder 20 on the left frame 21L and the right frame 21R of the supply chamber 21 moves toward the supply chamber 21 from the outside when the flattening roller 12 moves in the second direction Y2. More specifically, the controller 500 causes the flattening roller 12 to rotate clockwise (CW) when the flattening roller 12 moves in the second direction Y2 and contacts the surplus powder 20S deposited on the right frame 21R, and causes the flattening roller 12 to rotate counterclockwise (CCW) when the flattening roller 12 moves in the second direction and contacts the surplus powder 20S deposited on the left frame 21L as illustrated in FIG. 8B.

FIG. 8C illustrates the fabrication chamber 22 and the supply chambers 21 disposed adjacent to both the left and right sides of the fabrication chamber 22. The left frame 21L is disposed at the far end of the supply chamber 21 on the far side in the second direction Y2 in which the flattening roller 12 moves. The right frame 21R is disposed at the front end of the supply chamber 21 on the front side in the second direction Y2 in which the flattening roller 12 moves.

Similarly to the case illustrated in FIG. 8B, the controller 500 causes the flattening roller 12 to rotate clockwise (CW) when the flattening roller 12 moves in the second direction Y2 and contacts the surplus powder 20S deposited on the right frame 21R, and causes the flattening roller 12 to rotate counterclockwise (CCW) when the flattening roller 12 moves in the second direction and contacts the surplus powder 20S deposited on the left frame 21L as illustrated in FIG. 8C.

FIG. 8D illustrates the fabrication chamber 22 and the surplus powder chamber 29 disposed adjacent to the right side of the fabrication chamber 22. A right frame 29R is disposed at the front end of the surplus powder chamber 29 in the second direction Y2 in which the flattening roller 12 moves. The right frame 22R of the fabrication chamber 22 is also a left frame 29L of the surplus powder chamber 29 disposed at the far end of the surplus powder chamber 29 in the second direction Y2 in which the flattening roller 12 moves.

The controller 500 causes the flattening roller 12 to rotate when the flattening roller 12 moves on the surplus powder chamber 29 in the second direction Y2. Accordingly, the powder 20 can be moved in a desired direction by rotating the flattening roller 12 moving on the surplus powder chamber 29 in the second direction Y2. For example, the controller 500 causes the flattening roller 12 to rotate while contacting the powder 20 on the left frame 29L and the right frame 29R of the surplus powder chamber 29 and controls the rotation direction of the flattening roller 12 so that the flattening roller 12 moves the powder 20 in contact with the flattening roller 12 into the surplus powder chamber 29 from the outside. As a result, the surplus powder 20S can be collected in the surplus powder chamber 29.

Specifically, the controller 500 controls the rotation direction of the flattening roller 12 so that the bottom surface of the flattening roller 12 contacting the powder 20 on the left frame 29L and the right frame 29R of the surplus powder chamber 29 moves toward the surplus powder chamber 29 from the outside when the flattening roller 12 moves in the second direction Y2. More specifically, the controller 500 causes the flattening roller 12 to rotate clockwise (CW) when the flattening roller 12 moves in the second direction Y2 and contacts the surplus powder 20S deposited on the right frame 29R, and causes the flattening roller 12 to rotate counterclockwise (CCW) when the flattening roller 12 moves in the second direction and contacts the surplus powder 20S deposited on the left frame 29L as illustrated in FIG. 8D.

In order to implement the above-described configuration and operation, preferably, the three-dimensional fabrication apparatus 100 includes a position detector that detects the position of the flattening roller 12, and the controller 500 controls the rotation direction and rotation speed of the flattening roller 12 in response to the position of the flattening roller 12 detected by the position detector. Alternatively, the controller 500 may control the rotation direction and rotation speed of the flattening roller 12 based on the timing when the flattening roller 12 moves in the second direction Y2.

FIGS. 9A to 9E are illustrations of surplus powder 20S on the powder layer 31 in the three-dimensional fabrication apparatus 100 according to the present embodiment. FIGS. 9A to 9E illustrate examples of the powder layer 31 formed on the fabrication chamber 22. The portion surrounded by an oval in FIGS. 9A to 9E is a portion near the right frame 22R.

FIG. 9A illustrates an example of the powder layer 31 after the flattening roller 12 moves in the second direction Y2. In this example, when the flattening roller 12 contacts the surplus powder 20S deposited on the right frame 22R, the flattening roller 12 rotates clockwise (CW) at the same rotation speed as when the powder layer 31 is formed. The clockwise direction (CW) is opposite to the rotation direction when the powder layer 31 is formed. In this example, the surplus powder 20S deposited on the right frame 22R falls on the powder layer 31, and the surplus powder 20S is deposited in a straight line on the powder layer 31 that has been flattened.

FIG. 9B illustrates another example of the powder layer 31 after the flattening roller 12 moves in the second direction Y2. In this example, when the flattening roller 12 contacts the surplus powder 20S deposited on the right frame 22R, the flattening roller 12 does not rotate. Also in this example, the surplus powder 20S deposited on the right frame 22R falls on the powder layer 31, and the surplus powder 20S is deposited in a straight line on the powder layer 31 that has been flattened. An amount of the surplus powder 20S deposited on the powder layer 31 is smaller than in the example illustrated in FIG. 9A.

FIGS. 9C and 9D illustrate other examples of the powder layer 31 after the flattening roller 12 moves in the second direction Y2. In these examples, when the flattening roller 12 contacts the surplus powder 20S deposited on the right frame 22R, the flattening roller 12 rotates counterclockwise (CCW) at the lower rotation speed than when the powder layer 31 is formed. The counterclockwise direction (CCW) is the same rotation direction as when the powder layer 31 is formed. The rotation speed of the flattening roller 12 in the example illustrated in FIG. 9D is higher than the rotation speed of the flattening roller 12 in the example illustrated in FIG. 9C. In each example, the surplus powder 20S deposited on the right frame 22R falls on the powder layer 31, and the surplus powder 20S is deposited in a straight line on the powder layer 31 that has been flattened. The surplus powder 20S deposited on the powder layer 31 is less noticeable than the example illustrated in FIG. 9B.

FIG. 9E illustrates still another example of the powder layer 31 after the flattening roller 12 moves in the second direction Y2. In this example, when the flattening roller 12 contacts the surplus powder 20S deposited on the right frame 22R, the flattening roller 12 rotates counterclockwise (CCW) at the same rotation speed as when the powder layer 31 is formed. The counterclockwise direction (CCW) is the same rotation direction as when the powder layer 31 is formed. In this example, the surplus powder 20S deposited on the right frame 22R hardly falls on the powder layer 31, and the surplus powder 20S is not deposited in a straight line on the powder layer 31 that has been flattened.

As described above, preferably, the controller 500 controls the flattening roller 12 so that the rotation speed when the flattening roller 12 moves in the second direction Y2 is equal to or higher than the rotation speed when the powder layer 31 is formed. Accordingly, the powder 20 not forming the powder layer 31 can be reliably moved in a desired direction.

Figure 10:
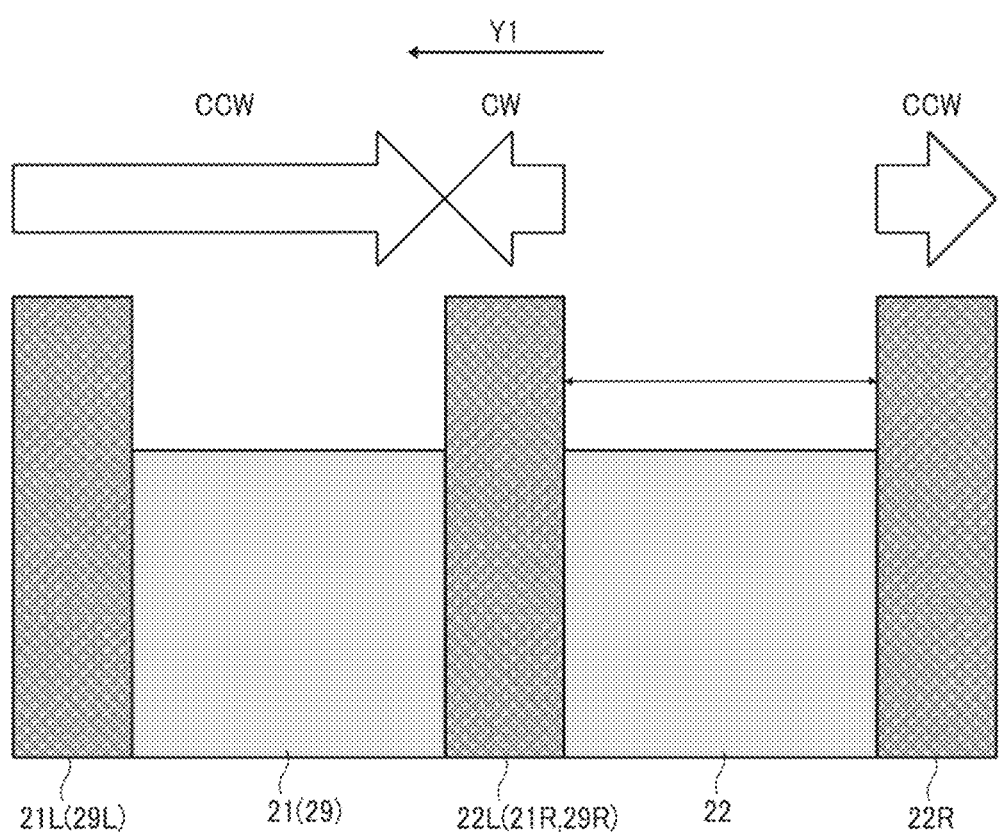
FIG. 10 is a schematic view illustrating another operation of the three-dimensional fabrication apparatus except when forming the powder layer according to the present embodiment.

FIG. 10 is a schematic view illustrating another operation of the three-dimensional fabrication apparatus 100 except when forming the powder layer 31 according to the present embodiment. FIG. 10 illustrates the fabrication chamber 22, and the supply chamber 21 or the surplus powder chamber 29 disposed adjacent to the left side of the fabrication chamber 22. The left frame 21L (or 29L) is disposed at the far end of the supply chamber 21 (or the surplus powder chamber 29) in the second direction Y2 in which the flattening roller 12 moves. The left frame 22L of the fabrication chamber 22 is also the right frame 21R of the supply chamber 21 disposed at the front end of the supply chamber 21 or the right frame 29R of the surplus powder chamber 29 disposed at the front end of the surplus powder chamber 29 in the second direction Y2 in which the flattening roller 12 moves.

The controller 500 causes the flattening roller 12 to rotate when the flattening roller 12 moves on the supply chamber 21 or the surplus powder chamber 29 in the second direction Y2. Accordingly, the powder 20 can be moved in a desired direction by rotating the flattening roller 12 that moves on the supply chamber 21 or the surplus powder chamber 29 in the second direction Y2. Similarly to the cases illustrated in FIGS. 8B to 8D, the controller 500 causes the flattening roller 12 to rotate clockwise (CW) when the flattening roller 12 moves in the second direction Y2 and contacts the surplus powder 20S deposited on the right frame 21R or 29R, and causes the flattening roller 12 to rotate counterclockwise (CCW) when the flattening roller 12 moves in the second direction and contacts the surplus powder 20S deposited on the left frame 21L or 29L.

Further, the controller 500 causes the flattening roller 12 to rotate without contacting the powder 20 on the supply chamber 21 or the surplus powder chamber 29. Accordingly, powder 20 adhering to the flattening roller 12 can be dropped into the supply chamber 21 or the surplus powder chamber 29 to collect the powder 20. Specifically, as described with reference to FIG. 7D, the controller 500 causes the flattening roller 12 to move in the second direction Y2 without contacting the powder 20 in the supply chamber 21 or the surplus powder chamber 29. Further, the controller 500 causes the flattening roller 12 to rotate when the flattening roller 12 passes between the right frame 21R and the left frame 21L, or between the right frame 29R and the left frame 29L.

More specifically, the controller 500 causes the flattening roller 12 to rotate counterclockwise (CCW) when the flattening roller 12 moves in the second direction Y2 and passes between the right frame 21R and the left frame 21L, or between the right frame 29R and the left frame 29L, and controls the rotation speed equal to or higher than the rotation speed when the powder layer 31 is formed. Accordingly, powder 20 adhering to the flattening roller 12 can reliably be dropped into the supply chamber 21 or the surplus powder chamber 29.

As described above, the three-dimensional fabrication apparatus 100 as a layer forming apparatus includes the fabrication chamber 22 as a loading unit including the fabrication stage 24 as a stage onto which powder 20 is supplied, the flattening roller 12 as a rotator that flattens the powder 20 on the fabrication stage 24 to form a powder layer 31, and the controller 500 as circuitry. The controller 500 causes the flattening roller 12 to move in the first direction Y1 parallel to a surface of the fabrication stage 24 and rotate while contacting the powder 20 on the fabrication stage 24 to form the powder layer 31. Further, the controller 500 causes the flattening roller 12 to move in the second direction Y2 opposite to the first direction Y1 and rotate while contacting surplus powder 20S not on the fabrication stage 24. Accordingly, the powder 20 not on the fabrication stage 24, which does not form the powder layer 31, can be moved in a desired direction by the flattening roller 12 moving in the second direction Y2 after the powder layer 31 is formed.

The controller 500 causes the flattening roller 12 to move in the second direction Y2 and rotate in a rotation direction so as to moves the surplus powder 20S in contact with the flattening roller 12 in a direction away from the powder layer 31. As a result, after the powder layer 31 is formed, the flattening roller 12 moving in the second direction Y2 can move the powder 20 not forming the powder layer 31 away from the powder layer 31, thereby preventing the surplus powder 20S from impairing the flatness of the upper surface of the powder layer 31.

The controller 500 causes the flattening roller 12 to move above the powder layer 31 in the second direction Y2 and not to rotate. Accordingly, when the flattening roller 12 moves above the powder layer 31 in the second direction Y2, the flattening roller 12 does not rotate and the powder 20 does not fall from the flattening roller 12 to the powder layer 31, thereby preventing the powder layer 31 from impairing the flatness of the upper surface.

The three-dimensional fabrication apparatus 100 further includes the supply chamber 21 as a supply unit that stores the powder 20. The flattening roller 12 supplies the powder 20 stored in the supply chamber 21 to the fabrication chamber 22. The controller 500 causes the flattening roller 12 to move above the supply chamber 21 in the second direction Y2 and rotate. Accordingly, the surplus powder 20S can be moved in a desired direction by rotating the flattening roller 12 moving above the supply chamber 21 in the second direction Y2.

The controller 500 causes the flattening roller 12 to rotate in a rotation direction so as to move the surplus powder 20S in contact with the flattening roller 12 around the supply chamber 21 into the supply chamber 21. As a result, the surplus powder 20S can be collected in the supply chamber 21.

Further, the controller 500 causes the flattening roller 12 to rotate without contacting the powder 20 in the supply chamber 21. Accordingly, powder 20 adhering to the flattening roller 12 can be dropped into the supply chamber 21 to collect the powder 20.

The three-dimensional fabrication apparatus 100 further includes the surplus powder chamber 29 as a receiving unit that receives the surplus powder 20S spilled from the fabrication chamber 22. The controller 500 causes the flattening roller 12 to move above the surplus powder chamber 29 in the second direction Y2 and rotate. Accordingly, the surplus powder 20S can be moved in a desired direction by rotating the flattening roller 12 moving above the surplus powder chamber 29 in the second direction Y2.

The controller 500 causes the flattening roller 12 to rotate in a rotation direction so as to move the surplus powder 20S in contact with the flattening roller 12 around the surplus powder chamber 29 into the surplus powder chamber 29. As a result, the surplus powder 20S can be collected in the surplus powder chamber 29.

Further, the controller 500 causes the flattening roller 12 to rotate without contacting the surplus powder 20S in the surplus powder chamber 29. Accordingly, powder 20 adhering to the flattening roller 12 can be dropped into the surplus powder chamber 29 to collect the surplus powder 20S.

The controller 500 causes the flattening roller 12 to move in the second direction Y2 and rotate at a rotation speed equal to or higher than the rotation speed at forming the powder layer 31. Accordingly, the powder 20 not forming the powder layer 31 can be reliably moved in a desired direction.

As described above, according to the present disclosure, the layer forming apparatus, a method of forming a powder layer, and a recording medium storing program codes for performing the method can be provided to move surplus powder not on the stage, which does not form the powder layer on the stage, in a desired direction.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A layer forming apparatus comprising:
   a loading unit including a supply stage onto which powder is supplied, and a fabrication stage;
   a rotator configured to flatten the powder on the fabrication stage to form a powder layer; and
   circuitry programmed to control the rotator to:

move in a first moving direction parallel to a surface of the fabrication stage and rotate while contacting the powder on the fabrication stage to form the powder layer; and move in a second moving direction opposite to the first direction and rotate while contacting surplus powder on a frame of the fabrication stage or a frame of the supply stage, the rotation of the rotator being in a first rotation direction based on overlapping the frame of the fabrication stage on a first side of the fabrication stage and a second rotation direction based on overlapping the frame of the fabrication stage on a second side of the fabrication stage, the second side of the fabrication stage being opposite to the first side of the fabrication stage in the second moving direction, wherein the circuitry is further programmed to cause the loading unit to lower the powder layer on the fabrication stage below a height of the frame after the rotator forms the powder layer and before the rotator moves in the second direction.

2. The layer forming apparatus according to claim 1, wherein the first and second rotation directions cause surplus powder on the frame of the loading unit in contact with the rotator to move in a direction away from the powder layer.

3. The layer forming apparatus according to claim 1, further comprising a supply unit configured to store the powder, wherein the rotator is configured to supply the powder stored in the supply stage to the fabrication stage, and wherein the circuitry is programmed to cause the rotator to move above the supply stage in the second direction and rotate.

4. The layer forming apparatus according to claim 3, wherein the circuitry is programmed to cause the rotator to rotate in one of the first and second rotation directions so as to move surplus powder on a frame of the loading unit adjacent the supply unit into the supply unit.

5. The layer forming apparatus according to claim 1, further comprising a receiving unit configured to receive surplus powder spilled from the loading unit, wherein the circuitry is programmed to cause the rotator to move above the receiving unit in the second direction and rotate.

6. The layer forming apparatus according to claim 5, wherein the circuitry is programmed to cause the rotator to rotate in one of the first and second rotation directions so as to move the surplus powder on a frame of the loading unit adjacent to the receiving unit into the receiving unit.

7. The layer forming apparatus according to claim 1, wherein the circuitry is programmed to cause the rotator to move in the second direction and rotate at a rotation speed equal to or higher than the rotation speed at forming the powder layer.

8. A method of forming a powder layer comprising:
supplying powder onto a supply stage of a loading unit;
causing a rotator to move in a first moving direction parallel to a surface of the supply stage and rotate while contacting the powder on the supply stage to move the powder to a fabrication stage and flatten the powder to form a powder layer; and
causing the rotator to move in a second moving direction opposite to the first direction and rotate while contacting surplus powder on a frame of the fabrication stage or a frame of the supply stage, the rotation of the rotator being in a first rotation direction based on overlapping the frame of the fabrication stage on a first side of the fabrication stage and a second rotation direction based on overlapping the frame of the fabrication stage on a second side of the fabrication stage, the second side of the fabrication stage being opposite to the first side of the fabrication stage in the second moving direction,
wherein the loading unit lowers the powder layer on the fabrication stage below a height of the frame after the rotator forms the powder layer and before the rotator moves in the second direction.

9. A non-transitory recording medium storing program codes which, when executed by one or more processors, cause the one or more processors to perform a method, the method comprising:
supplying powder onto a supply stage of a loading unit;
causing a rotator to move in a first moving direction parallel to a surface of the supply stage and rotate while contacting the powder on the supply stage to move the powder to a fabrication stage and flatten the powder to form a powder layer; and
causing the rotator to move in a second moving direction opposite to the first direction and rotate while contacting surplus powder on a frame of the fabrication stage or a frame of the supply stage, the rotation of the rotator being in a first rotation direction based on overlapping the frame of the fabrication stage on a first side of the fabrication stage and a second rotation direction based on overlapping the frame of the fabrication stage on a second side of the fabrication stage, the second side of the fabrication stage being opposite to the first side of the fabrication stage in the second moving direction,
causing the loading unit to lower the powder layer on the fabrication stage below a height of the frame after the rotator forms the powder layer and before the rotator moves in the second direction.

\* \* \* \* \*